United States Patent
Rembold et al.

(10) Patent No.: US 6,679,475 B2
(45) Date of Patent: Jan. 20, 2004

(54) PRESSURE CONTROL VALVE

(75) Inventors: Helmut Rembold, Stuttgart (DE); Walter Teegen, Waiblingen (DE); Walter Lorch, Zaberfeld (DE); Gerhard Wiltschek, Stuttgart (DE); Klaus Geistefeldt, Schwaig (DE); Juergen Haller, Sachsenheim (DE); Uwe Mueller, Hemmingen (DE); Harald Lang, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 10/074,016

(22) Filed: Feb. 14, 2002

(65) Prior Publication Data

US 2002/0113219 A1 Aug. 22, 2002

(30) Foreign Application Priority Data

Feb. 14, 2001 (DE) .......................................... 101 07 115

(51) Int. Cl.⁷ .................... F02M 59/96; F02M 63/00; F16K 31/02
(52) U.S. Cl. .................... 251/129.14; 251/129.15
(58) Field of Search ........... 251/129.01, 129.02–129.22

(56) References Cited

U.S. PATENT DOCUMENTS

| 5,639,061 A | * | 6/1997 | Krauter et al. | ......... 251/129.19 |
| 5,879,060 A | * | 3/1999 | Megerle et al. | ........ 251/129.02 |
| 6,152,420 A | * | 11/2000 | Hohl | ...................... 251/129.02 |
| 6,182,912 B1 | * | 2/2001 | Muller et al. | .......... 251/129.21 |

* cited by examiner

Primary Examiner—Paul J. Hirsch
(74) Attorney, Agent, or Firm—Ronald E. Greigg

(57) ABSTRACT

A pressure control valve serves to regulate the fuel pressure in a fuel system. The pressure control valve includes a valve housing, at least one inlet, at least one outlet, and at least one prestressed, electrically actuatable, and at least regionally ball-shaped valve member. The valve member cooperates with a valve seat structurally connected to the housing. To make it possible to achieve stable closed- and/or open-loop control properties of the pressure control valve, it is proposed that the valve seat widen conically toward the valve member, and the ball diameter of the valve member is selected such that with the valve closed, the valve member touches the valve seat in the vicinity of its farther end.

23 Claims, 6 Drawing Sheets

PRESSURE CONTROL VALVE

BACKGROUND OF THE INVENTION

1. Field of the Invention

The present invention relates to a pressure control valve for a direct-injection fuel system of an internal combustion engine, having a valve housing, at least one inlet, at least one outlet, and at least one prestressed, electrically actuatable, and at least regionally spherical valve member, which cooperates with a valve seat structurally connected to the housing.

2. Description of the Prior Art

One pressure control valve of the type which the invention is concerned is known from European Patent Disclosure EP 0 267 162. In this known pressure control valve, a valve ball is seated on the end of an inlet conduit that accordingly forms a valve seat. The ball is pressed against this valve seat by a valve tappet that is acted upon by a spring. Fastened to the end of the valve tappet remote from the ball is a magnet armature, which is surrounded by an annular electromagnet. When the magnet coil is not excited, the contact-pressure force of the valve ball is effected solely by the force of the spring. Upon an excitation of the magnet coil, the magnetic force is superimposed on this. The superposition takes place in the direction of the spring force, so that depending on the intensity of the magnetic force, the closing pressure of the valve can be increased beyond what the spring alone can exert.

However, in the known pressure control valve it has been found that the quality of the pressure control does not always meet the demands made of it. In particular, it has been demonstrated that the known pressure control valve tends to high-frequency fluttering under some circumstances.

OBJECTS AND SUMMARY OF THE INVENTION

It is therefore an object of the present invention to refine a pressure control valve of the type defined at the outset such that in a simple way, it can be operated reliably and makes stable pressure control possible.

In a pressure control valve of the type defined at the outset, this object is attained in that the valve seat widens conically toward the valve member, and the ball diameter of the valve member is selected such that with the valve closed, the valve member touches the valve seat in the vicinity of the further end of the valve seat.

According to the invention, it has been recognized that the flow downstream of the point of passage between the valve seat and the valve member can be calmed or stabilized if the flow is carried radially outward through a conical widening of the valve seat. This additionally requires, however, that the narrowest point of the passageway gap between the valve member and the valve seat be located as close as possible to the farther, that is, the downstream, end of the valve seat. In such an embodiment of the valve seat and the valve member, a relatively calm, stable, radially outward-oriented flow downstream of the point of passage through the valve gap is obtained when the valve is open.

This in turn makes markedly improved quality of the open- or closed-loop control of the fuel pressure in a fuel system possible. This makes more-accurate metering of the fuel upon injection, for instance into a combustion chamber of the engine, possible, which in turn improves the fuel consumption and emissions properties of the engine. The improvement in the open- and closed-loop control quality is achieved without requiring additional components or complex machining steps. Thus the pressure control valve of the invention can be produced relatively inexpensively.

In a first refinement of the invention it is proposed that the prestressing force is adjustable, in particular by means of a spring that can be tensed by a screw. In this way, the mechanical opening pressure for each pressure control valve can be adjusted in an especially simple way.

It is also possible that the valve member is embodied as a ball, and a retaining element is provided, in which the ball is retained transversely to the actuation direction. By means of such a retaining element, it is assured that even with the valve open, that is, when the valve member is lifted from the valve seat, the annular gap between the valve member and the valve seat is approximately the same size throughout. This prevents lateral differences in pressure at the annular gap, which under circumstances could cause a lateral oscillating motion of the valve member.

It is especially preferred if the retaining element has at least three radially inward-oriented retaining tongues, each with at least one radially inner wall on which the ball rests. With such retaining tongues, an unambiguous centering of the valve member relative to the valve seat is possible, without the passage of fluid being severely impaired by the retaining element.

In an especially preferred refinement, the pressure control valve of the invention includes a valve tappet, which acts upon the valve member. In addition, at least two plastic slide bushes are provided, in which the valve tappet is retained in an axially sliding fashion. Because of such minimally frictional or even frictionless bearing support of the valve tappet, the adjustment characteristic of the valve tappet has a slight hysteresis, which contributes to fine pressure adjustment by the pressure control valve.

The triggering of the pressure control valve can be effected in an especially simple way by providing that it is actuatable electromagnetically, and at least one magnet armature is retained on the valve tappet via a compression connection.

It is also especially preferred if the pressure control valve includes a magnet core, extending coaxially to the valve tappet, on which core one of the plastic slide bushes is secured, and the plastic slide bush, toward the armature, has a shoulder which serves as a spacer between the magnet core and the armature. The shoulder assures that even with the armature attracted, a remanent air gap required for the magnetic action is always available between the magnet core and the armature. Providing a magnet core leads to a boost in the magnetic action, which improves the dynamics of the pressure control valve of the invention. Disposing the plastic slide bush on the magnet core makes a separate retaining part unnecessary, which reduces the production cost for the pressure control valve of the invention.

According to the invention, a hydraulic module can also be provided, which includes the valve housing, the inlet, the outlet, the valve member, the valve seat, the prestressing element, the valve tappet, the armature, the magnet core, and the plastic slide bushes, and a coil module can be provided, which includes at least one magnet coil, extending coaxially to the magnet armature, as well as an electrical terminal, and the hydraulic module and coil module form separate component groups from one another.

This refinement of the pressure control valve of the invention has the advantage that the hydraulic module and the coil module can be produced separately from one another, which lowers the production costs because of the different production requirements. In the case of a defect, it is possible to replace the individual modules separately. Furthermore, a separate coil module makes it possible for different coil modules, equipped with the terminals to suit customer requirements, each to be combined with the same hydraulic module. Once again, this reduces the production cost for the pressure control valve of the invention, since at least for the hydraulic module, relatively large numbers are manufactured.

Connecting the hydraulic module to the coil module is preferably done via a frictional-engagement and/or detent connection. This also creates a means of securing it for shipping, which prevents parts located on the inside from becoming soiled or damaged. The fact that the frictional-engagement and/or detent connection can be disconnected again makes easy replacement of the parts possible.

In another refinement, it is proposed that the coil module includes an approximately U-shaped bracket element, which as its base has a fastening portion with at least two laterally protruding retaining flanges and as its legs has at least two striplike encapsulation portions, which fit over the coil from outside. With the U-shaped bracket element, the pressure control valve of the invention can thus be fastened in a simple way to some element of the fuel system. At the same time, the bracket element makes a boost in the magnetic force possible, by a laterally outer encapsulation of at least one region of the magnet coil.

It is especially preferred if the bracket element, on the ends of the legs, has fastening portions, in particular detent lugs, to which a cap element can be secured, in particular calked, with which cap element the coil is magnetically encapsulated on its end. The terminal encapsulation of the coil boosts the magnetic force still further, and the retention of the applicable cap is accomplished in a simple way by the bracket element.

It is also possible that the valve housing has a laterally outward-pointing shoulder, which rests on the bracket element. In this way, there is no need for separately fastening the hydraulic module to the coil module of the built-in pressure control valve, since in the built-in position, the hydraulic module is pressed with its shoulder against the coil module by the hydraulic pressure.

To further increase the magnetic force, it is proposed that there is a gap between the valve housing and the magnet core, and the valve housing is joined to the magnet core via a ring of an antimagnetic material.

In another preferred refinement of the pressure control valve of the invention, a receiving part with a stepped bore is provided, into which bore a connection peg of the valve housing is inserted, and an inlet-side line discharges into one portion of the stepped bore while an output-side line discharges into another portion, and the inlet-side line is sealed off from the outlet-side line by a first ring seal, and the outlet-side line is sealed off from environment by a second ring seal, and the second ring seal has a larger diameter than the first ring seal, and in the built-in state, the spacing between the first ring seal and the first step of the stepped bore is less than the spacing between the second ring seal and the second step, leading to the environment, and the fastening of the valve housing to the receiving part is elastic in the axial direction. This refinement of the pressure control valve of the invention is based on the following consideration:

Should the valve member become wedged in its closing position because of a defect, this means that the pressure limiting function of the pressure control valve is no longer operative. In that case, because of the axially elastic fastening of the valve housing to the receiving part, the valve housing and as a result the entire pressure control valve can be pushed out of the receiving part or out of the stepped bore as the hydraulic pressure increases.

If the inlet and outlet and the corresponding ring seals are embodied as claimed, it is assured that whenever the connection peg moves axially out of the receiving part, first the ring seal between the inlet and the outlet slips over the corresponding step, thus establishing a direct communication between the inlet and the outlet. In this way, virtually the entire pressure control valve acts as a valve element, which with increasing hydraulic pressure is lifted from its valve seat, namely the stepped bore. Thus even if the valve member is blocked, a certain pressure limiting function of the pressure control valve is assured.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENTS

Figure 1:
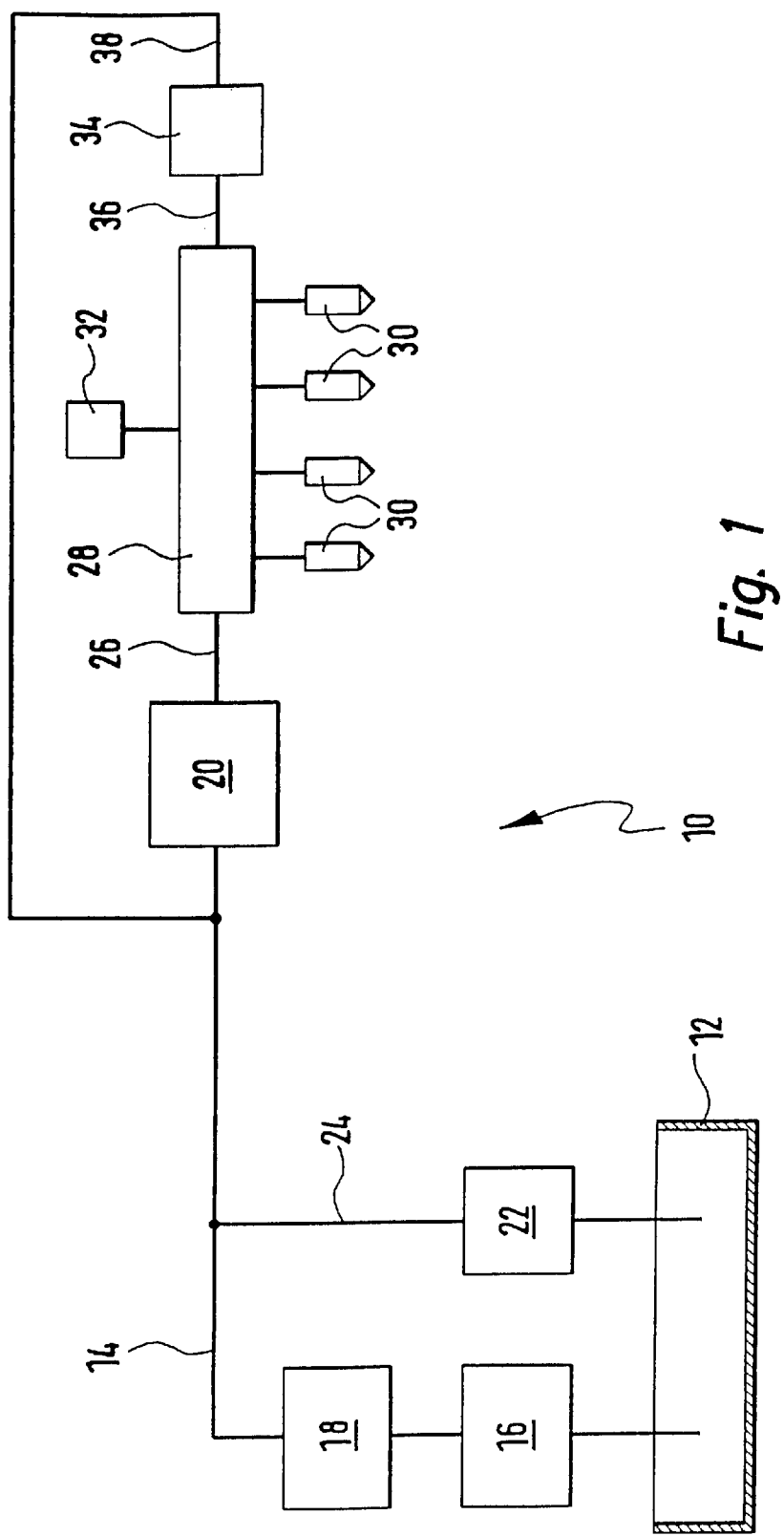
FIG. 1 is a basic illustration of a fuel system with a pressure control valve.

A fuel system is identified overall in FIG. 1 by reference numeral 10. It includes a fuel tank 12, from which fuel is pumped via a fuel line 14 by an electric fuel pump 16 to a filter 18 and from there to a high-pressure pump 20. The pressure in the fuel line 14 is regulated by a low-pressure regulator 22, which is disposed in a branch line 24.

From the high-pressure pump 20, a high-pressure fuel line 26 leads to a fuel collection line 28, called a "rail". Connected to the rail, in the present exemplary embodiment, are four high-pressure injection valves 30. By way of these valves, the fuel is injected directly into a combustion chamber, not shown, of an internal combustion engine, also not shown. The pressure in the rail 28 monitored up by a pressure sensor 32.

The adjustment of the pressure in the rail 28 is effected by a pressure control valve 34, which communicates on its inlet side with the rail 28 via a fuel line 36 and on the outlet side with the low-pressure fuel line 14 via a fuel line 38. By means of the pressure control valve 34, the pressure in the rail 28 can be adjusted within a range of approximately 4 to 130 bar. To that end, the pressure control valve 34 is triggered by an open- and closed-loop control unit, not shown. This unit in turn receives signals from the pressure sensor 32. Adjusting the pressure in the rail 28 can be done by means of a closed control loop or by simple triggering of the pressure control valve 34.

Figure 2:
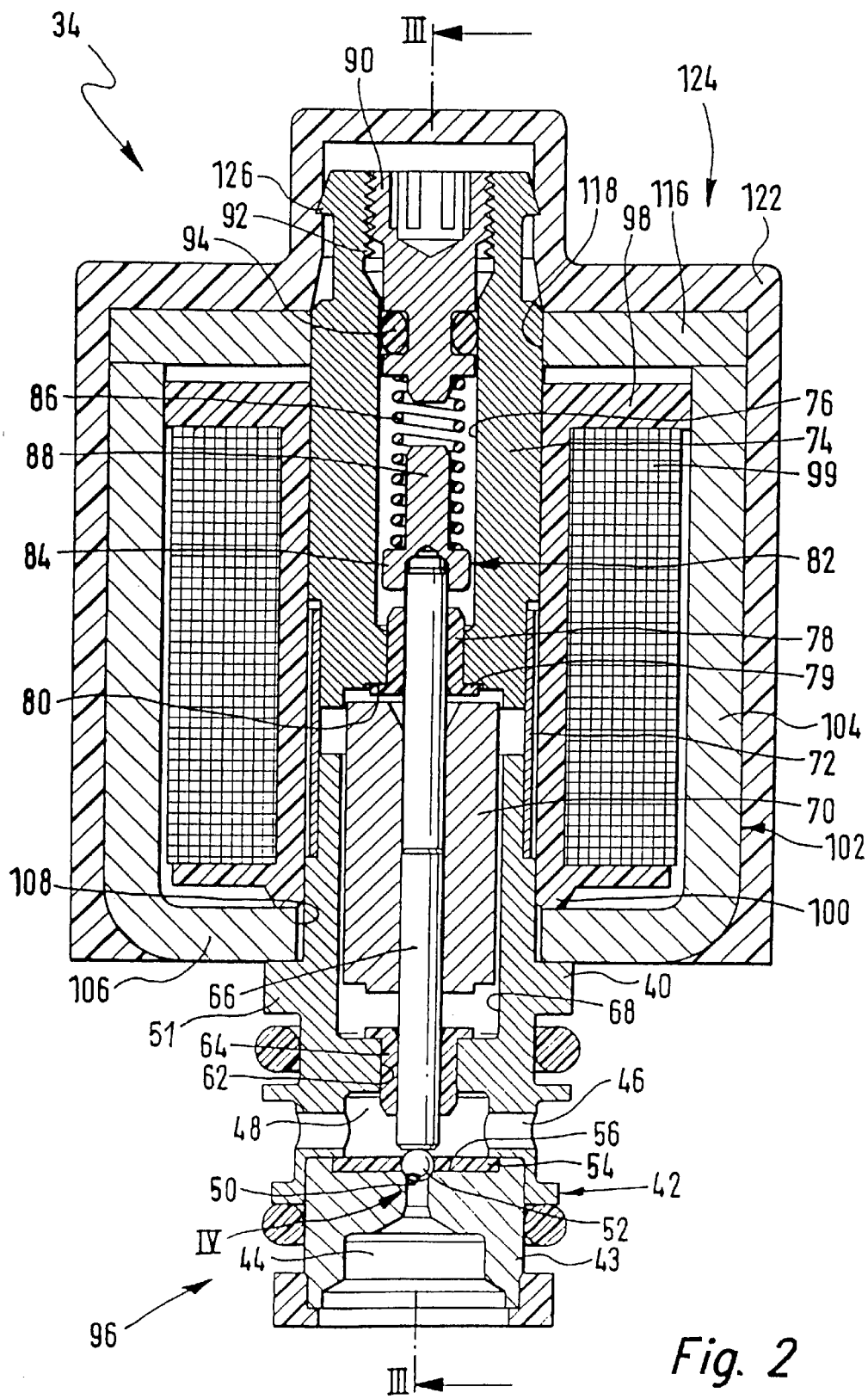
FIG. 2 shows a longitudinal section through the pressure control valve of FIG. 1.
Figure 3:
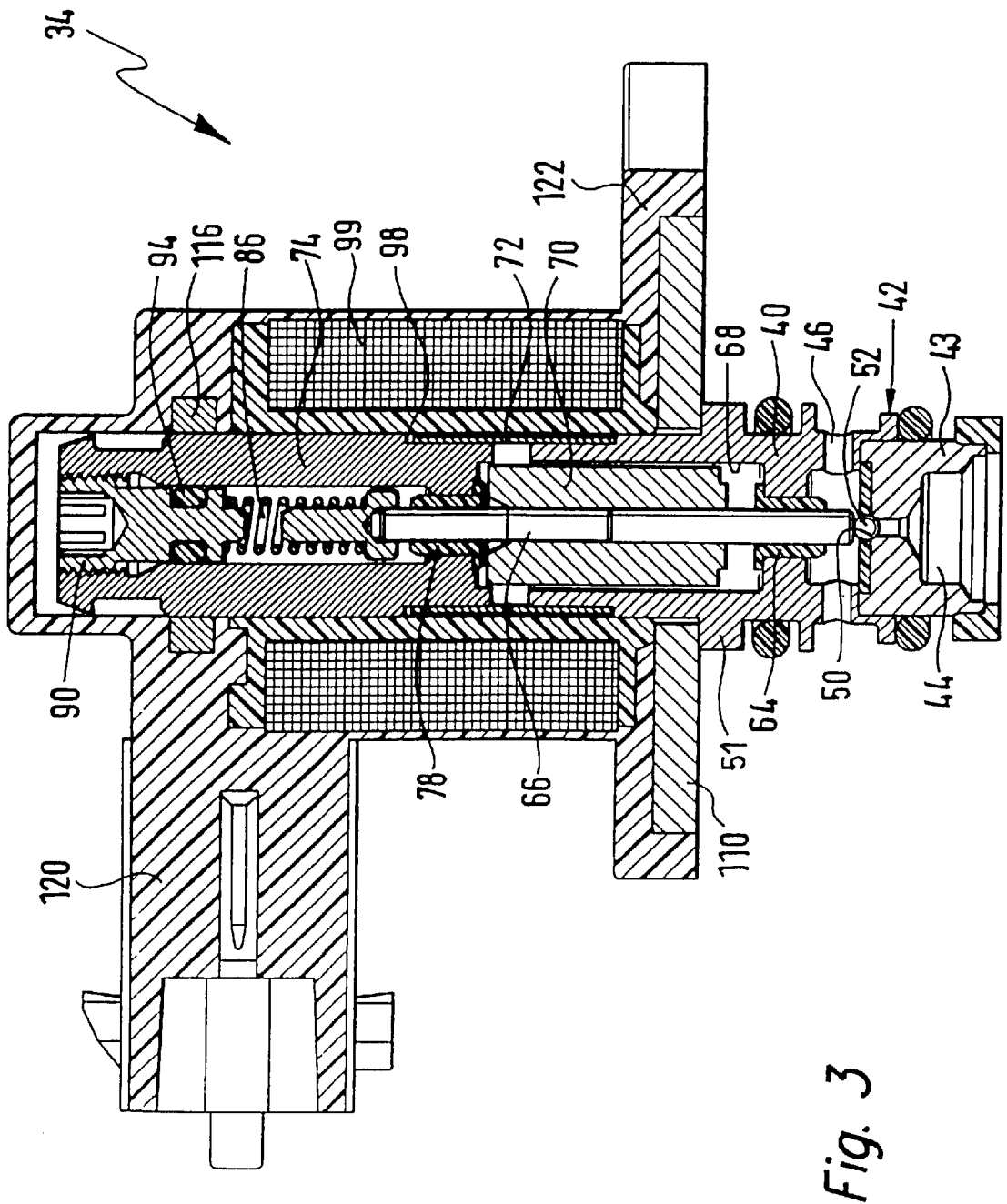
FIG. 3 is a section taken along the line III—III of FIG. 2.
Figure 4:
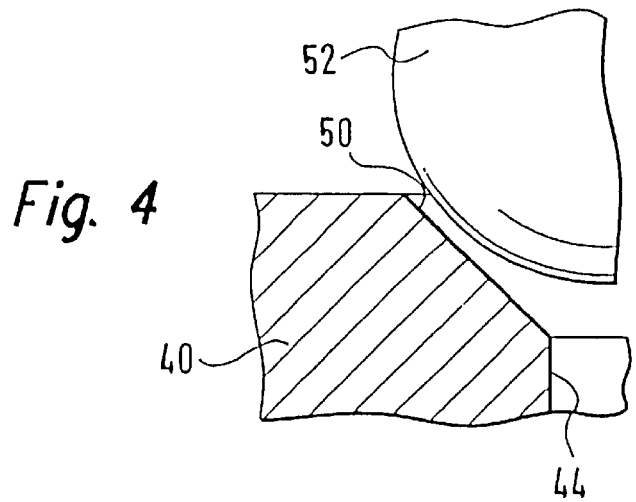
FIG. 4 shows a detail of the injection valve in FIG. 2.

The pressure control valve 34 will now be described in detail, referring to FIGS. 2–9 (for the sake of simplicity, not all the reference numerals are shown in FIG. 3):

First, the pressure control valve 34 includes a cylindrical valve housing 40 which in its lower region in FIGS. 2 and 3, together with a valve body 43 forms a connection peg 42. Extending coaxially in this connection peg 42 is an inlet conduit 44, embodied as a stepped bore. Above the inlet conduit 44 are two radially extending outlet conduits 46 (in another exemplary embodiment, not shown, there is only one outlet conduit; more than two outlet conduits are equally conceivable). The inlet conduit 44 and the outlet conduits 46 communicates with a flow chamber 48 in the interior of the connection peg 42. A filter piece is mounted on the free end of the connection peg 42. Approximately in its center axially, the valve housing 40 has an encompassing, radially outward-pointing annular rib 51.

The stepped bore of the inlet conduit 44 narrows axially from the outside inward. However, a conical widened portion 50 (see FIG. 4) is also present on the upper end of the uppermost portion, in FIG. 2, of the inlet conduit 44. This widened portion forms a valve seat for a valve ball 52. The diameter of the valve ball 52 is selected such that whenever the valve ball 52 rests on the valve seat 50, the valve ball 52 touches the valve seat 50 in the vicinity of its farther or in other words upper end in FIGS. 2–4.

The valve ball 52 is retained radially of the connection peg 42 by a retaining element 54. The retaining element has a triangular outer contour, with rounded corners. An also approximately triangular recess 56, again with rounded corners, is present in the center of the retaining element 54. From the centers of the sides of the triangle of the recess 56, retaining tongues 58 extend radially inward, and the radially inner wall of the retaining tongues in each case is identified by reference numeral 60. The valve ball 52 rests on these radially inner walls 60 of the retaining tongues 58. In this way, the valve ball 52 is retained transversely to the actuation direction by the retaining tongues 58. The retaining element 54 has a generally disklike shape and is inserted into an axial recess in the top side of the valve body 43.

The upper boundary wall of the flow chamber 48 is pierced by a bore 62, into which a first plastic slide bush 64 is inserted. A valve tappet 66 embodied as a cylindrical pin is supported with little friction in the first plastic slide bush 64. Above the flow chamber 48 in the valve housing 40, there is a further coaxial, cylindrical recess 68, which is open at the top. A cylindrical magnet armature 70 is pressed onto the valve tappet 66. The lower end face of the magnet armature is spaced apart from the lower end face of the recess 68. With its upper end, the magnet armature 70 protrudes past the upper end of the valve housing 40.

An annular element 72 made of an antimagnetic material is welded onto the outer jacket face, on the upper end of the valve housing 40. The annular element 72 likewise protrudes past the upper end of the valve housing 40 and is welded at its upper end to a magnet core 74 that extends coaxially to the valve housing 40. The outside diameter of the magnet core 74 is approximately equivalent to the outside diameter of the upper portion of the valve housing 40.

The magnet core 74 has a bore 76 that extends over its full length. The through bore 76 is likewise embodied in stepped fashion. A second plastic slide bush 78 is inserted into the lowermost portion of this bore in terms of FIGS. 2 and 3. With a shoulder 79, the plastic slide bush 78 protrudes somewhat past the base of a countersunk feature 80 in the underside of the magnet core 74. The diameter of the countersunk feature 80 is somewhat greater than the diameter of the magnet armature 70. The shoulder 79 forms a spacer for the armature 70. The upper end, in terms of FIGS. 2 and 3, of the valve tappet 66 is supported with little friction in the second plastic slide bush 78.

A spring holder 82 is fastened to the upper end of the valve tappet 66. The spring holder, on its end toward the valve tappet 66, has a head 84, on which a compression spring 86 is braced. The compression spring 86 extends upward coaxially to the valve tappet 66 and is guided by an upward-extending guide portion 88 of the spring holder 82. The upper end of the spring 86 is in turn braced on an adjusting screw 90. This screw is screwed into the magnet core 74 in a threaded portion 92 in the upper region of the through bore 76.

The adjusting screw 90 is sealed off from the through bore 76 by an O-ring seal 94. By means of the adjusting screw 90, the prestressing force of the spring 86 can be adjusted. The prestressing force of the spring 86 is transmitted via the valve tappet 66 to the valve ball 52, and as a result the valve ball is pressed against the valve seat 50.

The valve housing 40, the valve body 43 with the inlet conduit 44 and the outlet conduits 46, the valve ball 52 and the associated valve seat 50, the compression spring 86, the valve tappet 66, the plastic slide bushes 64 and 78, the magnet armature 70, the magnet core 74, the spring holder 82 and the adjusting screw 90 together form a hydraulic module 96 that forms a cohesive component group.

To generate a magnetic force, first an annular winding holder 98 is provided. This winding holder is disposed coaxially to the valve housing 40 and surrounds the upper region of the valve housing 40 as well as the lower region of the magnet core 74. Winding wire is wound onto the winding holder 98, forming a coil 99. On its lower end, the winding holder 98 has a radially inner collar 100, which protrudes axially downward and with its edge rests on the bracket element 102 and is spray-coated.

Figure 8:
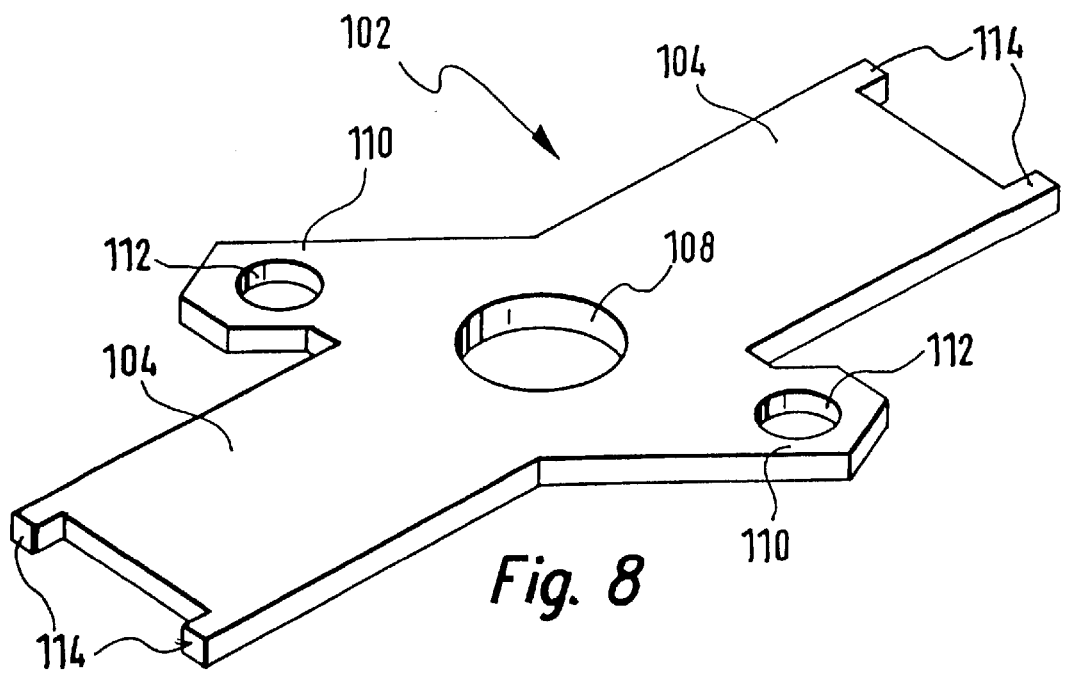
FIG. 8 is a perspective view of a blank from which a bracket element of the pressure control valve of FIG. 1 is made.
Figure 9:
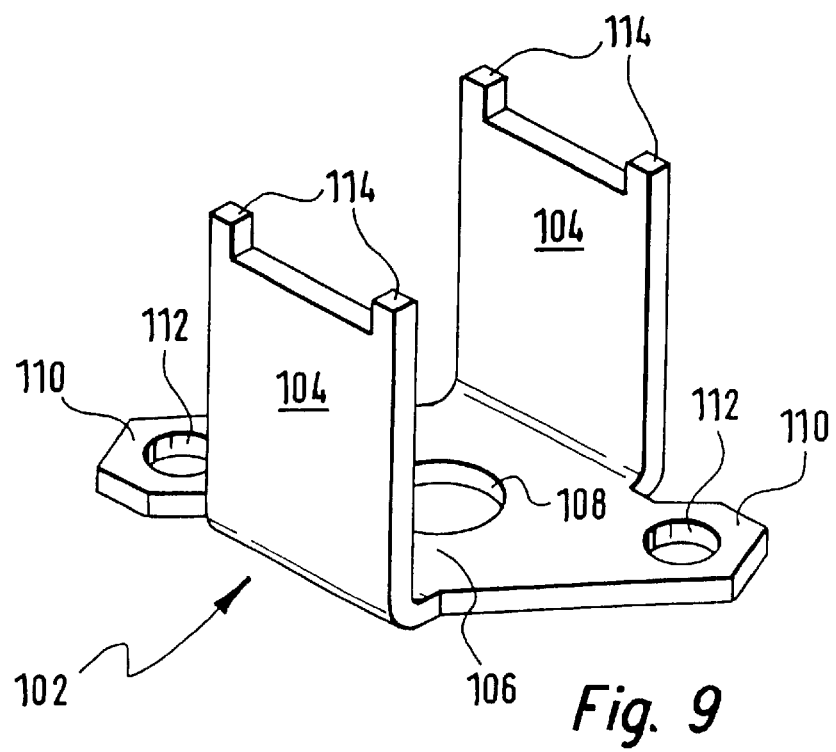
FIG. 9 shows the bracket element made from the blank of FIG. 8.

The bracket element 102 is shown in detail in FIGS. 8 and 9. It is stamped out as a flat part (FIG. 8) and then, by bending two legs 104 upward, shaped into a U-shaped part. There is a circular recess 108 in a base 106 of the bracket element 102, the inside diameter of which recess is approximately equivalent to the outside diameter of the upper portion of the valve housing 40. Two retaining flanges 110 protrude laterally from the base 106, and in each of the retaining flanges there are respective fastening bores 112.

The legs 104 of the bracket element 102 form striplike encapsulation portions, which fit from outside over the winding holder 98 with the coil 99 wound onto it. Detent lugs 114 are embodied on the ends of the legs 104 and are calked to a platelike cap element 116. The cap element 116 likewise has a central recess 118, whose diameter is approximately equivalent to the outside diameter of the magnet core 74. By means of the bracket element 102 and the cap element 116, an external encapsulation of the coil 99 on the winding holder 98 is created.

The coil 99 on the winding holder 98 is connected to a radially protruding flat plug 120. The bracket element 102, cap element 116, flat plug 120 and winding holder 98 with the coil 99 are entirely sheathed with plastic 122. The winding holder 98 with the coil 99, the bracket element 102, the cap element 116, the flat plug 120 and the molded plastic sheath 122 together form a coil module 124 embodied as a separate component.

The joining of the coil module 124 to the hydraulic module 96 is effected simply by slipping the coil module 124 onto the hydraulic module 96 until the base 106 of the bracket element 102 rests on the annular shoulder 51 of the valve housing 40. The coil module 124 is prevented from slipping off the hydraulic module 96 by detent lugs 126, which are embodied in the upper region of the magnet core and dig into the molded plastic sheath 122. Because the pressure control valve 34 has both a hydraulic module 96, embodied as a separate component group, and a coil module 124, also embodied as a separate component group, it is possible to connect the hydraulic module 96 to different coil modules 124.

This in turn makes it possible to produce the hydraulic module 96 in very large numbers, which reduces its production costs. The coil module, which is relatively simple to produce, can in turn be equipped to meet specific customer requirements, for instance being equipped with a special flat plug 120. In the case of a defect, the coil module 124 can simply be pulled off the hydraulic module 96, which makes the central components of the hydraulic module 96 easily accessible so they can be checked and if needed repaired.

Figure 5:
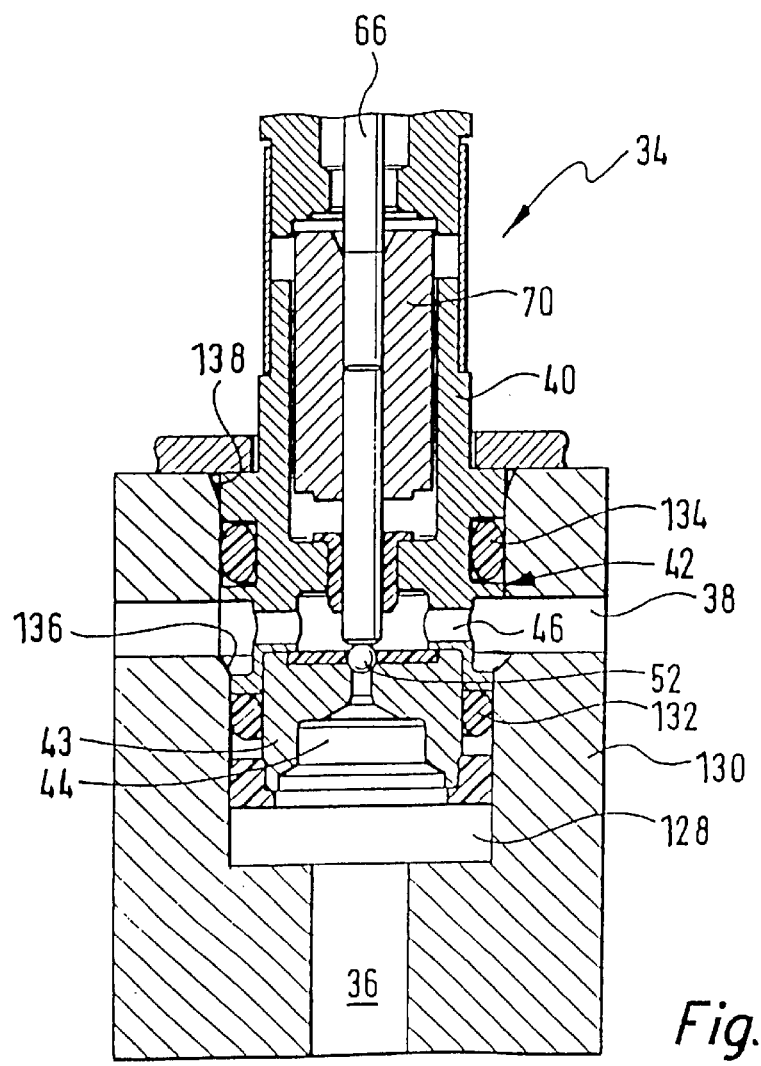
FIG. 5 is a longitudinal section through a region of the pressure control valve of FIG. 1 and of a receiving part.
Figure 6:
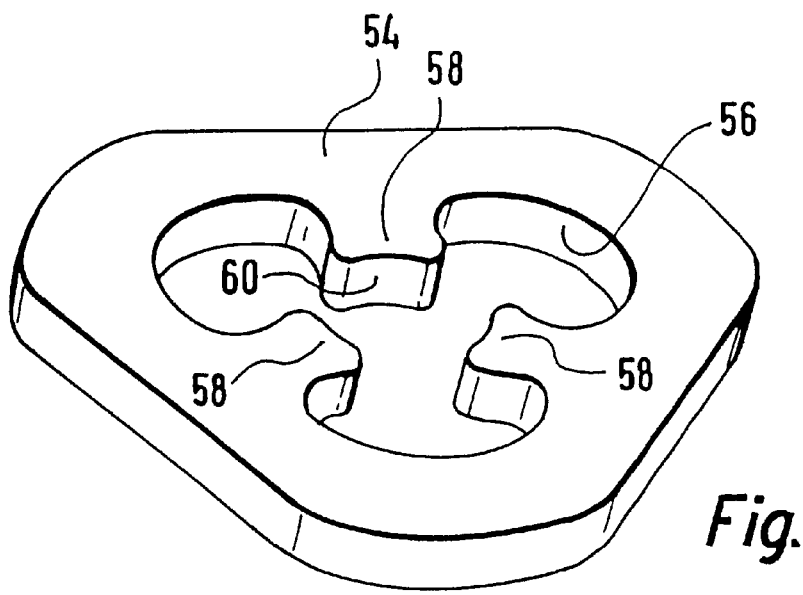
FIG. 6 shows a retaining element for a valve member of the pressure control valve of FIG. 1 in perspective.
Figure 7:
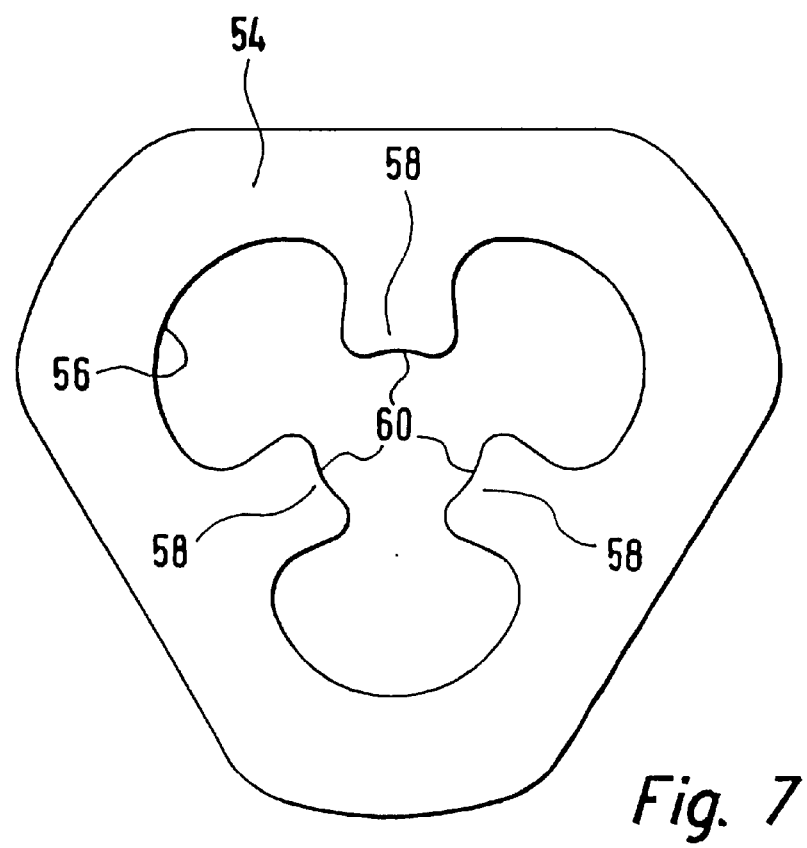
FIG. 7 is a plan view on the retaining element of FIG. 6.

As can be seen from FIG. 5, the pressure control valve 34 can be inserted, with the connection peg 42 of the valve housing 40 leading, into a stepped bore 128 of a receiving part 130. The receiving part 130 can be disposed at various places in the fuel system 10. For instance, it is possible for it to be present directly on the rail 28. However, mounting it directly on the high-pressure pump 20 is also conceivable.

The receiving part 130 can be provided as a separate part or can be embodied integrally with the rail 28 or the housing of the high-pressure pump 20. The fuel line on the input side, embodied in the receiving part 130, is identified by reference numeral 36 as in FIG. 1, while conversely the fuel line on the output side is identified by reference numeral 38. The pressure control valve 34 is secured to the receiving part 130 via the retaining flanges 110, shown only in part in FIG. 5. The hydraulic module is pressed by the fuel pressure with its annular rib 51 against the bracket element 102.

The pressure control valve 34 functions as follows: If the magnet unit, formed by the coil 99 and the winding holder 98, is not excited, the opening pressure of the pressure control valve 34 is determined solely by the prestressing force of the spring 86. If the applicable limit pressure is exceeded, the valve ball 52 is lifted from the valve seat 50 because of the pressure difference between the inlet conduit 44 and the flow chamber 48. As a result, fuel from the inlet-side line 36 and the inlet conduit 44 passes through the gap between the valve seat 50 and the valve ball 52 to reach the flow chamber 48, and it can flow out into the outlet-side line 38 via the outlet conduits 46.

Because the valve seat 50 is embodied as a conical widened portion, and the passageway gap for the fuel between the valve ball 52 and the valve seat 50 is located in the region of the farther end of the valve seat 50, upon opening of the pressure control valve 34 a stable flow state is achieved, making the quality of closed- and open-loop control of the pressure control valve 34 optimal. Lateral oscillating motions of the valve ball 52 are reliably prevented by the retaining element 54 with the retaining tongues 58.

To make a different opening pressure of the pressure control valve 34 possible, electric current is delivered to the coil 99. Depending on the type and intensity of the current delivered, the magnet core 74 exerts a force on the magnet armature 70. This force is superimposed on the prestressing force furnished by the spring 86. Because the magnet core 74 exerts a force of attraction on the magnet armature 70, the contact pressure exerted by the valve tappet 66 on the valve ball 52 decreases, so that the valve ball 52 is pressed with a lesser force against the valve seat 50. As a result, the opening pressure of the pressure control valve 34 is lowered. In this way, different pressures in the rail 28 can be established. A lowering of the rail pressure to approximately 4 bar is possible. This is equivalent to the pressure that typically prevails in the fuel line 14.

The shoulder 79, acting like a spacer, of the plastic slide bush 78 assures that even if the magnet armature 70 is completely attracted, a remanent air gap required for the magnetic action will always be present between the magnet armature 70 and the magnet core 74. The magnetic decoupling between the valve housing 40 and the magnet core 74 is assured by the antimagnetic ring element 72. By means of the slide bushes 64 and 78, the valve tappet is supported with little friction, so that upon actuation it exhibits only slight hysteresis—if any.

Yet even if the valve ball 52, for whatever reasons, is blocked on the valve seat 50, or in other words opening of the pressure control valve 34 is not possible, the pressure control valve 34 can still provide an "emergency pressure limiting function". This is accomplished as follows:

As seen particular from FIG. 5, the connection peg 42 of the valve housing 40 has two ring seals 132 and 134 on its outside. FIG. 5 also shows that between the portion of the stepped bore 128 of smaller diameter in the receiving part 130 and the portion thereof of larger diameter, there is a step 136, embodied as an insertion chamfer. The region of larger diameter of the stepped bore 128 likewise has an insertion chamfer 138 on its upper end. The lower ring seal 132 in terms of FIG. 5 assures sealing between the inlet-side line 36 and the outlet-side line 38, while conversely the upper ring seal 134 in FIG. 5 assures sealing between the outlet-side line 38 and the environment. The lower ring seal 132 has a smaller diameter, adapted to the diameter of the corresponding portion of the stepped bore 128, than the upper ring seal 134.

If the pressure in the inlet-side line 36 now rises, and if because of a jammed valve ball 52 this pressure increase cannot be diverted via the inlet conduit 44, flow chamber 48 and outlet conduits 46 to the outlet-side line 38, then because of the differential pressure between the inlet-side line 36 and the environment, the entire pressure control valve 34 is pushed somewhat out of the stepped bore 128 in the receiving part 130. This is possible because the retaining flanges 110 of the bracket element 102 have a certain elasticity in the axial direction of the pressure control valve 34.

Since as FIG. 5 shows the spacing between the lower ring seal 132 and the insertion chamfer 136 is less than the spacing between the upper ring seal 134 and the insertion chamfer 138, when the pressure control valve 34 moves axially upward it is the lower ring seal 132 that first reaches the region of the insertion chamfer 136, while conversely the upper ring seal 134 still remains in the region of the larger-diameter portion of the stepped bore 128.

However, if the lower ring seal 132 reaches the region of the insertion chamfer 136, the sealing action between the ring seal 132 and the wall of the stepped bore 128 lessens, so that fuel can flow directly from the inlet-side line 36 past the ring seal 132 to reach the outlet-side line 38, circumventing the pressure control valve 34. In that case, the entire pressure control valve 34 together with the lower ring seal 132 accordingly acts as a valve member, and the stepped bore 128 in the receiving part 130 acts as a valve seat. The retaining flanges 110 on the bracket element 102 act as a prestressing element.

In this way, pressure from the inlet-side line 36 can be let off into the outlet-side line 38 even whenever the pressure control valve 34 is no longer functioning properly. Thus it remains assured that no fuel will reach the environment.

In closing, it should be pointed out that the terms "lower" and "upper" used in the description of the present exemplary embodiment pertain to the disposition of the pressure control valve 34 in FIGS. 1–9. It is understood that the pressure control valve 34 can be installed in an arbitrary position in a fuel system 10. However, preferably it is installed in a more or less upright position, to avert the problem of soiling and icing up during operation of the pressure control valve.

The foregoing relates to a preferred exemplary embodiment of the invention, it being understood that other variants and embodiments thereof are possible within the spirit and scope of the invention, the latter being defined by the appended claims.

We claim:

1. A pressure control valve (34) for a direct-injection fuel system (10) of an internal combustion engine, the valve comprising
   a valve housing (40, 43),
   at least one inlet (44),
   at least one outlet (46), and
   at least one prestressed (86),
   electrically actuatable (70, 74, 98, 99) and at least regionally spherical valve member (52), which cooperates with a valve seat (50) structurally connected to the housing, the valve seat (50) widening conically toward the valve member (52), and the ball diameter of the valve member (52) being selected such that with the valve (34) closed, the valve member (52) touching the valve seat (50) in the vicinity of the farther end of the valve seat.

2. The pressure control valve (34) of claim 1 wherein the prestressing force is adjustable, in particular by means of a spring (86) that can be tensed by a screw (90).

3. The pressure control valve (34) of claim 1 wherein the valve member is embodied as a ball (52), and a retaining element (54) is provided, in which the ball (52) is retained transversely to the actuation direction.

4. The pressure control valve (34) of claim 2 wherein the valve member is embodied as a ball (52), and a retaining element (54) is provided, in which the ball (52) is retained transversely to the actuation direction.

5. The pressure control valve (34) of claim 3 wherein the retaining element (54) has at least three radially inward-oriented retaining tongues (58), each with at least one radially inner wall (60) on which the ball (52) rests.

6. The pressure control valve (34) of claim 1 wherein the valve includes a valve tappet (66), which acts upon the valve member (52), and at least two plastic slide bushes (64, 78) are provided, in which the valve tappet (66) is retained in an axially sliding fashion.

7. The pressure control valve (34) of claim 2 wherein the valve includes a valve tappet (66), which acts upon the valve member (52), and at least two plastic slide bushes (64, 78) are provided, in which the valve tappet (66) is retained in an axially sliding fashion.

8. The pressure control valve (34) of claim 3 wherein the valve includes a valve tappet (66), which acts upon the valve member (52), and at least two plastic slide bushes (64, 78) are provided, in which the valve tappet (66) is retained in an axially sliding fashion.

9. The pressure control valve (34) of claim 4 wherein the valve includes a valve tappet (66), which acts upon the valve member (52), and at least two plastic slide bushes (64, 78) are provided, in which the valve tappet (66) is retained in an axially sliding fashion.

10. The pressure control valve (34) of claim 6 wherein the valve is actuatable electromagnetically, and at least one magnet armature (70) is retained on the valve tappet (66) via a compression connection.

11. The pressure control valve (34) of claim 7 wherein the valve is actuatable electromagnetically, and at least one magnet armature (70) is retained on the valve tappet (66) via a compression connection.

12. The pressure control valve (34) of claim 8 wherein the valve is actuatable electromagnetically, and at least one magnet armature (70) is retained on the valve tappet (66) via a compression connection.

13. The pressure control valve (34) of claim 9 wherein the valve is actuatable electromagnetically, and at least one magnet armature (70) is retained on the valve tappet (66) via a compression connection.

14. The pressure control valve (34) of claim 10 wherein the valve includes a magnet core (74), extending coaxially to the valve tappet (66), on which core one of the plastic slide bushes (78) is secured, and the plastic slide bush (78), toward the armature (70), has a shoulder (79) which serves as a spacer between the magnet core (74) and the armature (70).

15. The pressure control valve (34) of claim 14 wherein the valve comprises a hydraulic module (96) is provided, which includes the valve housing (40, 42), the inlet (44), the outlet (46), the valve member (52), the valve seat (50), the compression spring (86), the valve tappet (66), the armature (70), the magnet core (74), and the plastic slide bushes (64, 78), and a coil module (124) which includes at least one magnet coil (98, 99), disposed laterally of the magnet core (74), as well as an electrical terminal (120), and the hydraulic module (96) and coil module (124) form separate component groups from one another.

16. The pressure control valve (34) of claim 15 wherein the hydraulic module (96) and the coil module (124) are detachably connected to one another via a frictional-engagement and/or a detent connection (126).

17. The pressure control valve (34) of claim 15 wherein the coil module (124) includes an approximately U-shaped bracket element (102), which as its base (106) has a fastening portion with at least two laterally protruding retaining flanges (110) and as its legs (104) has at least two striplike encapsulation portions, which fit over the coil (98, 99) from the outside.

18. The pressure control valve (34) of claim 16 wherein the coil module (124) includes an approximately U-shaped bracket element (102), which as its base (106) has a fastening portion with at least two laterally protruding retaining flanges (110) and as its legs (104) has at least two striplike encapsulation portions, which fit over the coil (98, 99) from the outside.

19. The pressure control valve (34) of claim 17 wherein the bracket element (102), on the ends of the legs (104), has fastening portions, in particular detent lugs (114), to which a cap element can be secured, in particular calked, with which cap element the coil (98, 99) is magnetically encapsulated on its end.

20. The pressure control valve (34) of claim 17 wherein the valve housing (40, 43) has a laterally outward-pointing shoulder, which rests on the bracket element (102).

21. The pressure control valve (34) of claim 19 wherein the valve housing (40, 43) has a laterally outward-pointing shoulder, which rests on the bracket element (102).

22. The pressure control valve (34) of claim 14 wherein there is a gap between the valve housing (40, 43) and the magnet core (74), and the valve housing (40, 43) is joined to the magnet core (74) via a ring (72) of an antimagnetic material.

23. The pressure control valve (34) of claim 11 wherein the valve further comprises a receiving part (130) with a stepped bore (128), into which bore a connection peg (42) of the valve housing (40, 43) is inserted, and an inlet-side line (36) discharges into one portion of the stepped bore (128) while an output-side line (38) discharges into another portion, and the inlet-side line (36) is sealed off from the outlet-side line (38) by a first ring seal (132), and the outlet-side line (38) is sealed off from environment by a second ring seal (134), and the second ring seal (134) has a larger diameter than the first ring seal (132), and in the built-in state, the spacing between the first ring seal (132) and the first step (136) of the stepped bore (128) is less than the spacing between the second ring seal and the second step (138), leading to the environment, and the fastening of the valve housing (40, 43) to the receiving part (130) is elastic in the axial direction.

* * * * *